United States Patent

Murayama et al.

[11] 3,898,303
[45] Aug. 5, 1975

[54] PIPERIDINE-SPIRO-HYDANTOIN DERIVATIVES AND THEIR USE AS STABILIZERS

[75] Inventors: Keisuke Murayama; Syoji Morimura; Takao Yoshioka; Toshimasa Toda; Eiko Mori; Hideo Horiuchi; Susumu Higashida; Katsuaki Matsui; Tomoyuki Kurumada; Noriyuki Ohta; Hisayou Osawa, all of Tokyo, Japan

[73] Assignee: Sankyo Co., Ltd., Tokyo, Japan

[22] Filed: May 10, 1973

[21] Appl. No.: 358,966

[30] Foreign Application Priority Data
June 3, 1972 Japan.............................. 47-55263
May 31, 1972 Japan.............................. 47-54061

[52] U.S. Cl. .................. 260/880 R; 260/2.5 BB; 260/45.8 NT; 260/77.5 SS; 260/864
[51] Int. Cl. ...................... C08f 45/60; C08g 51/60
[58] Field of Search ....... 260/45.8 N, 45.8 NT, 864, 260/880

[56] References Cited
UNITED STATES PATENTS

| | | | |
|---|---|---|---|
| 2,684,965 | 7/1954 | Weston et al. | 260/293.87 |
| 3,126,393 | 3/1964 | Young | 260/293.87 |
| 3,474,068 | 10/1969 | Murayama et al. | 260/45.8 |
| 3,542,729 | 11/1970 | Murayama et al. | 260/45.8 |
| 3,547,874 | 12/1970 | Murayama et al. | 260/45.8 |
| 3,705,126 | 12/1972 | Matsui et al. | 260/45.8 |
| 3,705,166 | 12/1972 | Murayama et al. | 260/293.86 |
| 3,759,926 | 9/1973 | Chalmers et al. | 260/293.9 |

Primary Examiner—Donald E. Czaja
Assistant Examiner—R. A. White
Attorney, Agent, or Firm—Toren, McGeady and Stanger

[57] ABSTRACT

New piperidine-spiro-hydantoin derivatives represented by the formula

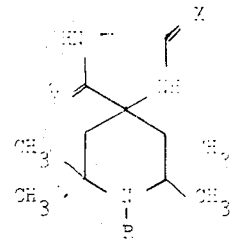

wherein R represents an alkyl group, an alkenyl group, an alkenoyl group which may be substituted with an aryl group, a hydroxyalkyl group, an alkoxyalkyl group, an alkoxycarbonylalkyl group, an acyloxyalkyl group, a cyanoalkyl group or nitroso group, and X and Y individually represent oxygen atom or sulfur atom. They are useful as stabilizers against photo- and thermal-deterioration of various synthetic polymers.

9 Claims, No Drawings

PIPERIDINE-SPIRO-HYDANTOIN DERIVATIVES AND THEIR USE AS STABILIZERS

This invention relates to a new class of piperidine-spiro-hydantoin derivatives and their use as stabilizers.

More particularly, this invention is concerned with a piperidine-spiro-hydantoin derivative having the formula

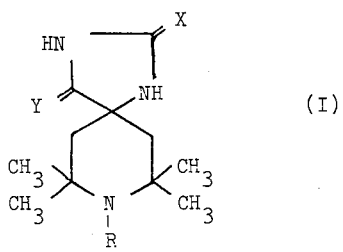

wherein
R represents an alkyl group, an alkenyl group, an alkenoyl group which may be substituted with an aryl group, a hydroxyalkyl group, an alkoxyalkyl group, an alkoxycarbonylalkyl group, an acyloxyalkyl group, a cyanoalkyl group of nitroso group, and X and Y individually represent oxygen atom or sulfur atom. Also, it is concerned with a synthetic polymer composition stabilized against photo- and thermal-deterioration by having incorporated therein at least one of the piperidine-spiro-hydantoin derivatives (I) in a sufficient amount to prevent the above deterioration.

The term "synthetic polymer" as used herein is contemplated to include:
olefin, diene and styrene polymers
including homopolymers of olefins, dienes and styrene (e.g. low and high density polyethylenes, polypropylene, polystyrene, polybutadiene and polyisoprene), and copolymers of olefins, dienes and styrene with each other or with other ethylenically-unsaturated monomers (e.g. ethylene-propylene copolymers, ethylene-butene copolymers, ethylene-vinyl acetate copolymers, styrene-butadiene copolymers and acrylonitrile-butadiene-styrene copolymers);
vinyl chloride and vinylidene chloride polymers
including homopolymers of vinyl chloride and vinylidene chloride, vinyl chloride-vinylidene chloride copolymers, and copolymers of vinyl chloride or vinylidene chloride with vinyl acetate or other ethylenically-unsaturated monomers;
polyacetals
e.g. polyoxymethylene and polyoxyethylene;
polyesters
e.g. polyethylene terephthalate;
polyamides
e.g. nylon-6, nylon-6,6 and nylon-6,10; and
polyurethanes.

In the above formula (I), the alkyl group may be preferably of 1 to 8 carbon atoms, for example, methyl, ethyl, n-propyl, n-butyl, isobutyl, pentyl, hexyl, heptyl or octyl; the alkenyl group may be preferably of 3 to 4 carbon atoms, for example, allyl or trans-2-butenyl; the alkenoyl group optionally substituted with the aryl group may be preferably of 3 to 4 carbon atoms in the alkenoyl moiety and of 6 to 10 carbon atoms in the aryl moiety, for example, acryloyl, crotonoyl or cinnamoyl; the hydroxyalkyl group may be preferably of 1 to 4 carbon atoms, for example, hydroxymethyl, 2-hydroxyethyl, 3-hydroxypropyl or 4-hydroxybutyl; the alkoxyalkyl group may be preferably of 1 to 8 carbon atoms in each of the alkoxy and alkyl moieties, for example, 2-methoxyethyl, ethoxymethyl, 2-ethoxyethyl, 4-propoxybutyl or 2-octoxyethyl; the acyloxyalkyl group may be preferably of 1 to 4 carbon atoms in the alkyl moiety and of a saturated or unsaturated aliphatic or aromatic acyl moiety, for example, 2-acetoxyethyl, 2-propionyloxyethyl, 3-butylryloxypropyl, benzoyloxymethyl, 2-benzoyloxyethyl, 2-acryloyloxyethyl or 2-methacryloyloxyethyl; the alkoxycarbonylalkyl group may be preferably of 1 to 4 carbon atoms in the alkyl moiety and of 1 to 18 carbon atoms in the alkoxy moiety, for example, methoxycarbonylmethyl, ethoxycarbonylmethyl, 2-butoxycarbonylethyl, octoxycarbonylmethyl or stearyloxycarbonylmethyl; the cyanoalkyl group may be preferably of 1 to 4 carbon atoms, for example, cyanomethyl, 2-cyanoethyl, 3-cyanopropyl or 4-cyanobutyl, Synthetic polymers have been widely utilized in the art, in view of their excellent properties, in various forms or shapes, for example, filament, fibre, yarn, film, sheet, other molded article, latex and foam. However, these polymers have some drawbacks such as poor light- and heat-stabilities and the like. Stated illustratively, polyolefins and polyurethane elastomers frequently tend to undergo severe deterioration when exposed to light such as sunlight or ultraviolet ray, and polyvinyl chloride and polyvinylidene chloride frequently tend to deteriorate and become colored by the action of light and heat together with elimination of hydrogen chloride therefrom. Polyamides are also frequently subjected to photo-deterioration. For the purpose of stabilizing these synthetic polymers against such deterioration, there have heretofore been proposed in the art a number of stabilizers; for example, for polyolefins, benzotriazole compounds and benzophenone compounds; for polyurethanes, phenol compounds and benzophenone compounds; and for polyvinyl chloride and polyvinylidene chloride, lead salts such as basic lead silicate and tribasic lead maleate, and organotin compounds such as dibutyltin laurate and dibutyltin maleate.

Although such prior stabilizers are believed to be considerably satisfactory, some problems to be improved still remain.

Thus, numerous attempts have been made in the art to fild and develop new and more effective stabilizers. As a result of our extensive studies to find a new type of stabilizers, it has been found that the piperidine-spiro-hydantoin derivatives of the formula (I) exhibit a high stabilizing effect against photo- and thermal-deterioration of the synthetic polymers.

It is accordingly an object of this invention to provide a new class of the piperidine-spiro-hydantoin derivatives (I) having practical utility as stabilizers for the synthetic polymers.

Another object of this invention is to provide a synthetic polymer composition stabilized against the deterioration thereof by having incorporated therein, in a sufficient amount to prevent such deterioration, at least one of the piperidine-spiro-hydantoin derivatives (I).

Other objects of this invention will become apparent from the following description.

In one aspect of this invention, there is provided a new group of the piperidine-spiro-hydantoin derivatives (I).

Of the piperidine-spiro-hydantoin derivatives (I), a preferable class can be represented by the following formula:

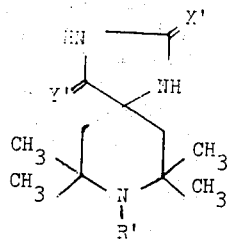

wherein
R' is an alkyl group of 1 to 8 carbon atoms, an alkenyl group of 3 to 4 carbon atoms, an alkenoyl group of 3 to 4 carbon atoms, an alkoxyalkyl group of 1 to 8 carbon atoms in each of the alkoxy and alkyl moieties, an alkoxycarbonylalkyl group of 1 to 4 carbon atoms in the alkyl moiety and 1 to 18 carbon atoms in the alkoxy moiety, an acyloxyalkyl group of 1 to 4 carbon atoms in the alkyl moiety and of an unsaturated or saturated aliphatic or aromatic acyl moiety and a cyanoalkyl group of 1 to 4 carbon atoms and X' and Y' each represent oxygen atom.

Representative examples of the piperidine-spiro-hydantoin derivatives of the formula (I) which may be advantageously employed in this invention are listed below.

| Compound No. | Chemical Name |
|---|---|
| 1 | 1,3,8-triaza-7,7,8,9,9-pentamethyl-spiro[4.5]-decane-2,4-dione |
| 2 | 1,3,8-triaza-7,7,8,9,9-pentamethyl-spiro[4.5]-decane-2,4-dithione |
| 3 | 1,3,8-triaza-7,7,9,9-tetramethyl-8-octyl-spiro[4.5]decane-2,4-dione |
| 4 | 1,3,8-triaza-8-(2-ethoxyethyl)-7,7,9,9-tetramethyl-spiro[4.5]decane-2,4-dione |
| 5 | 8-acryloyl-1,3,8-triaza-7,7,9,9-tetramethyl-spiro[4.5]decane-2,4-dione |
| 6 | 1,3,8-triaza-8-cinnamoyl-7,7,9,9-tetramethyl-spiro[4.5]decane-2,4-dione |
| 7 | 1,3,8-triaza-7,7,9,9-tetramethyl-8-nitroso-spiro-[4.5]decane-2,4-dione |
| 8 | 8-allyl-1,3,8-triaza-7,7,9,9-tetramethyl-spiro[4.5]decane-2,4-dione |
| 9 | 1,3,8-triaza-8-(2-hydroxyethyl)-7,7,9,9-tetramethyl-spiro[4.5]decane-2,4-dione |
| 10 | 8-(2-acetoxyethyl)-1,3,8-triaza-7,7,9,9-tetramethyl-spiro[4.5]decane-2,4-dione |
| 11 | 1,3,8-triaza-8-(2-benzoyloxyethyl)-7,7,9,9-tetramethyl-spiro[4.5]decane-2,4-dione |
| 12 | 1,3,8-triaza-8-(2-cyanoethyl)-7,7,9,9-tetramethyl-spiro[4.5]decane-2,4-dione |
| 13 | 1,3,8-triaza-8-(2-cyanoethyl)-7,7,9,9-tetramethyl-spiro[4.5]decane-2,4-dithione |
| 14 | 1,3,8-triaza-8-ethoxycarbonylmethyl-7,7,9,9-tetramethyl-spiro[4.5]decane-2,4-dione |

In view of a stabilizing effect, those compounds having the above Compound Nos. 1,3,4,5,8,10,12 and 14 are preferable and, most preferably, may be utilized those compounds having the above Compound Nos. 1,4,8, and 14 as stabilizers for synthetic polymers.

The piperidine-spiro-hydantoin derivatives (I) of this invention are all new compounds as stated above and can be easily prepared by various methods, some of which will be illustratively described below:

(A)

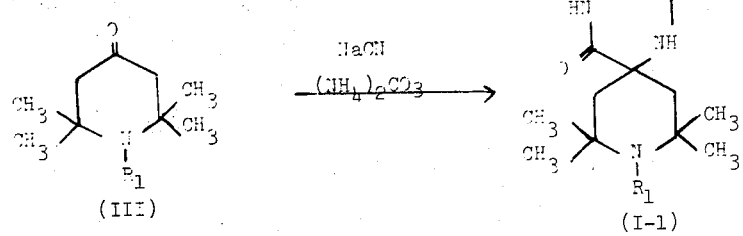

In the above formulae, $R_1$ represents an alkyl group, a hydroxyalkyl group, an acyloxyalkyl group or an alkoxycarbonylalkyl group.

The compounds (I-1) may be prepared by reacting the starting compounds (III) with an alkali cyanide and ammonium carbonate.

(B)

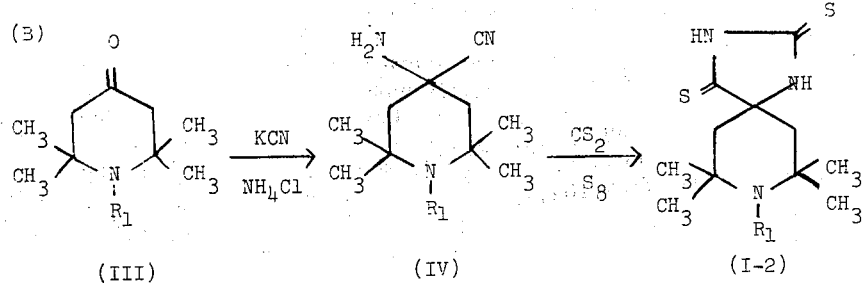

In the above formulae, $R_1$ represents an alkyl group, a hydroxyalkyl group, an acyloxyalkyl group or an alkoxycarbonylalkyl group.

The compounds (I-2) may be prepared by reacting the starting compounds (III) with potassium cyanide and ammonium chloride to produce the intermediate (IV) and then reacting the latter product thus obtained with carbon disulfide and sulfur.

(C)

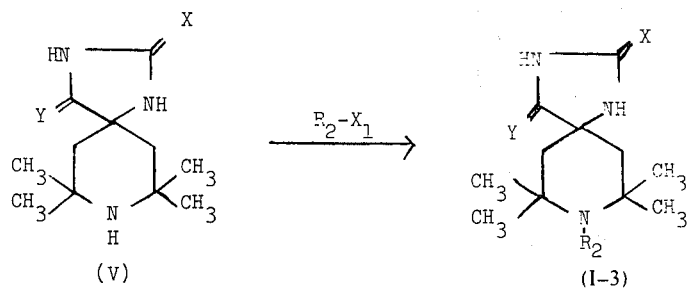

In the above formulae, $R_2$ represents an alkoxyalkyl group, an alkenoyl group which may be substituted with an aryl group or nitroso group, $X_1$ is a halogen atom and X and Y are as defined above.

The compounds (I-3) may be prepared by reacting the starting compounds (V) with a halide in the presence of a base.

(D)

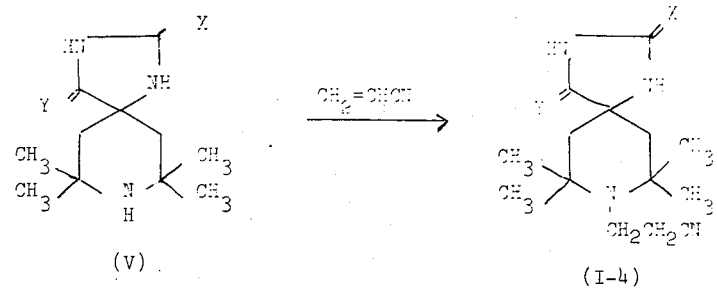

In the above formulae, X and Y are as defined above.

The compounds (I-4) may be prepared by reacting the starting compounds (IV) with acrylonitrile.

(E)

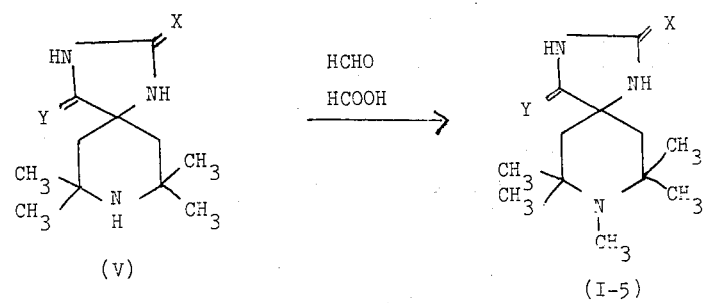

In the above formulae, X and Y are as defined above.

The compounds (I-5) may be prepared by reacting the starting compounds (V) with formaldehyde and formic acid.

In another aspect of this invention, there is provided a synthetic polymer composition stabilized against photo- and thermal-deterioration thereof wherein there is incorporated, in a sufficient amount to prevent such deterioration, at least one of the piperidine-spirohydantoin derivatives(I).

The amount of the compound or compounds of formula (I) needed for effective stabilization of the synthetic polymer will depend on a variety of factors, such as the type and properties of the polymer concerned, its intended use, and the presence, of other stabilizers. It is generally satisfactory to use from 0.01 to 5.0% by weight of the compounds of formula (I), based on the weight of the synthetic polymer, but the most effective range will vary with the type of polymer - viz. 0.01 to 2.0%, preferably 0.02 to 1.0%, by weight for olefin, diene and styrene polymers; 0.01 to 1.0%, preferably 0.02 to 0.5%, by weight for vinyl chloride and vinylidene chloride polymers; and 0.01 to 5.0%, preferably 0.02 to 2.0%, by weight for polyurethanes and polyamides. If desired, two or more of the compounds of the invention may be used together.

The stabilizers of the invention may readily be incorporated into the synthetic polymers by conventional techniques, at any convenient stage prior to the manufacture of shaped articles therefrom. For example, the stabilizer may be mixed with the synthetic polymer in dry powder form, or a suspension or emulsion of the stabilizer may be mixed with a solution, suspension or emulsion of the synthetic polymer.

The stabilized synthetic polymer compositions of the invention may also contain various conventional additives, such as antioxidants, ultraviolet absorbers, fillers and pigments. The following are examples of antioxidants which may be used: phenolic compounds, such as 2,6-di-t-butyl-p-cresol, 4,4'-thiobis(6-t-butyl-3-methylphenol), 2,2'-thiobis(6-t-butyl-4-methylphenol), 4,4'-bis(2,6-di-t-butylphenol), 4,4'-bis(2,6-diisopropylphenol), 2,4,6-triisopropylphenol, 4,4'-butylidene-bis(6-t-butyl-3-methylphenol), 1,1,3-tris(5-t-butyl-4-hydroxy-2-methylphenyl)butane, tetrakis-[β-3,5-di-t-butyl-4-hydroxyphenyl)propionyloxymethyl]methane, and 2,4,6-tris(3,5-di-t-butyl-4-hydroxybenzyl)mesitylene; thiodipropionates, such as dilauryl thiodipropionate; and alkyl, aryl, or aralkyl phosphites, such as triphenyl phosphite, tris(p-nonyl)-phenyl phosphite and diphenyl decyl phosphite. The following are examples of ultraviolet absorbers which may be used, benzotriazoles, such as 2-(2'-hydroxy-5'-methylphenyl)benzotriazole and 2-(3',5'-di-t-butyl-2'-hydroxyphenyl)-5-chlorobenzotriazole; salicylates, such as 4-t-butylphenyl salicylate; benzophenones, such as 2-hydroxy-4-octoxybenzophenone; and 2',4'-di-t-butylphenyl-3,5-di-t-butyl-4-hydroxybenzoate, methylα-cyano-β-methyl-β-(p-methoxyphenyl)acrylate, and [2,2'-thiobis(4-t-octylphenolate)]-n-butylamine Ni$^{II}$. If such conventional stabilizers are employed, it is preferred to use them in a weight ratio of 0.5–3:1 with respect to the stabilizers of the invention.

This invention will be more fully illustrated by the following examples.

Examples 1 to 7 describe the preparation of the piperidine-spiro-hydantoin derivatives (I) of this invention.

Examples 8 to 16 describe the synthetic polymer compositions stabilized against their photo- and thermal-deterioration by having incorporated therein the piperidine-spiro-hydantoin derivatives (I) as well as their stabilizing effects.

EXAMPLE 1

1,3,8-Triaza-7,7,9,9-tetramethyl-8-octyl-spiro[4.5]-decane-2,4-dione

To a solution of 3 g. of sodium cyanide and 16 g. of ammonium carbonate in 40 ml. of 50 % aqueous ethanol was added 3.5 g. of 2,2,6,6-tetramethyl-4-oxo-1-octylpiperidine and the resulting mixture was stirred at room temperature for 30 minutes and subsequently at 45°–55°C. for additional 3 hours.

Then, the reaction mixture was concentrated and the crystalline residue was washed with water and then dried. Recrystallization from a mixture of petroleum benzine and benzene gave the desired product as white crystals melting at 187°–189°C.

Analysis for $C_{19}H_{35}N_3O_2$— Calculated: C,67.61%; H,10.45%; N,12.45%. Found: C,67.47%; H,10.39%; N,12.16%.

IR spectrum (Nujol mull): $\nu_{NH}$ 3340; 3150 cm$^{-1}$, $\nu_{c=o}$ 1770, 1703 cm$^{-1}$.

EXAMPLE 2

1,3,8-Triaza-8-ethoxycarbonylmethyl-7,7,9,9-tetramethyl-spiro[4.5]decane-2,4-dione To a solution of 4 g. of sodium cyanide and 22 g. of ammonium carbonate in 50 ml. of 50 % aqueous ethanol was added 5 g. of 1-ethoxycarbonylmethyl-2,2,6,6-tetramethyl-4-oxopiperidine and the resulting mixture was stirred at room temperature for 20 minutes and subsequently at 45°–50°C. for 3 hours.

Then, the reaction mixture was concentrated and the crystalline residue was washed with water and then dried. Recrystallization from 20 % aqueous ethanol gave the desired product as white crystals melting at 193°–194°C.

Analysis for $C_{15}H_{25}N_3O_4$—Calculated: C,57.86%; H,8.09%; N,13.50%. Found: C,57.90%; H,8.09%; N,13.66%.

IR spectrum (Nujol mull):$\nu_{NH}$ 3350; 3180 cm$^{-1}$, $\nu_{c=o}$ 1778; 1752; 1710 cm$^{-1}$.

Substantially following the same procedure as set forth above, those compounds indicated below were prepared.

8-allyl-1,3,8-triaza-7,7,9,9-tetramethyl-spiro[4.5]-decane-2,4-dione, dione, m.p. 241.5°–243°C.

1,3,8-triaza-8-(2-hydroxyethyl)-7,7,9,9-tetramethyl-spiro[4.5]decane-2,4-dione, m.p. 225°C. (with decomposition)

8-(2-acetoxyethyl)-1,3,8-triaza-7,7,9,9-tetramethyl-spiro[4.5]decane-2,4-dione, m.p. 212°–213°C.

1,3,8-triaza-8-(2-benzoyloxyethyl)-7,7,9,9-tetramethyl-spiro[4.5]-decane-2,4-dione, m.p. 215°–217°C.

EXAMPLE 3

8-Acryloyl-1,3,8-triaza-7,7,9,9-tetramethyl-spiro[4.5]-decane-2,4-dione

To a suspension of 3 g. of sodium carbonate and 5 g. of 1,3,8-triaza-7,7,9,9-tetramethyl-spiro[4.5]decane-2,4-dione in 40 ml. of dimethylformamide was added a solution of 3 g. of acryloyl chloride in 10 ml. of dimethylformamide at room temperature. After completion of the addition, the resulting mixture was stirred at room temperature for 30 minutes and subsequently at 60°–70°C. for additional 4 hours.

Then, the reaction mixture was concentrated and to the crystalline residue was added a dilute aqueous solution of acetic acid. The mixture was filtered to recover an insoluble crystalline substance, which was washed with water, dried and recrystallized from dioxane to give the desired product as white crystals melting at 346°–347°C.

Analysis for $C_{14}H_{21}N_3O_3$—Calculated: C,60.19%; H,7.58%; N,15.04%. Found: C,60.35%; H,7.60%; N,15.20%.

IR spectrum (Nujol mull): $\nu_{NH}$ 3320; 3170 cm$^{-1}$, $\nu_{c=o}$ 1770; 1735; 1630 cm$^{-1}$, $\nu_{c=c}$ 1610 cm$^{-1}$.

Substantially following the same procedure as set forth above, those compounds indicated below were prepared.

1,3,8-triaza-8-(2-ethoxyethyl)-7,7,9,9-tetramethyl-spiro[4.5]-decane-2,4-dione, m.p. 138°–139°C.

1,3,8-triaza-8-cinnamoyl-7,7,9,9-tetramethyl-spiro[4.5]decane-2,4-dione, m.p. 331°–332°C.

1,3,8-triaza-7,7,9,9-tetramethyl-8-nitroso-spiro[4.5]decane-2,4-dione, m.p. 250°–251°C. (with decomposition)

EXAMPLE 4

1,3,8-Triaza-8-(2-cyanoethyl)-7,7,9,9-tetramethyl-spiro[4.5]decane-2,4-dione To a suspension of 2.3 g. of 1,3,8-triaza-7,7,9,9-tetramethyl-spiro[4.5]decane-2,4-dione and 1 g. of acrylonitrile in 20 ml. of ethanol was added 0.5 ml. of a 40 % "Triton-B" (Benzyltrimethylammonium hydroxide) solution in methanol and the resulting mixture was stirred at 40°–50°C. for 90 minutes.

Then, the reaction mixture was concentrated and the crystalline residue was recrystallized from benzene to give the desired product as white crystals melting at 190°–191°C.

Analysis for $C_{14}H_{22}N_4O_2$—Calculated: C,60.41%; H,7.97%; N,20.13%. Found: C,60.40%; H,7.97%; N,20.08%.

In spectrum (Nujol mull): $\nu_{NH}$ 3340; 3290 cm$^{-1}$, $\nu_{c\equiv N}$ 2220 cm$^{-1}$, $\nu_{c=o}$ 1760; 1702 cm$^{-1}$.

EXAMPLE 5

1,3,8-Triaza-8-(2-cyanoethyl)-7,7,9,9-tetramethyl-spiro[4.5]decane-2,4-dithione The same procedure as set forth in the above Example 4 was repeated except that 2.6 g. of 1,3,8-triaza-7,7,9,9-tetramethyl-spiro[4.5]decane-2,4-dithione and 1 g. of acrylonitrile were employed and recrystallization of the crystalline residue was made from benzene, thereby yielding the desired product as white crystals melting at 180°–181°C.

Analysis for $C_{14}H_{22}N_4S_2$—Calculated: C,54.18%; H,7.15%; N,18.05%; S,20.62%. Found: C,54.35%; H,7.11%; N,18.00%; S,20.77%.

IR spectrum (Nujol mull): $\nu_{NH}$ 3310; 3110 cm$^{-1}$, $\nu_{c\equiv N}$ 2220 cm$^{-1}$.

EXAMPLE 6

1,3,8-Triaza-7,7,8,9,9-pentamethyl-spiro[4.5]decane-2,4-dione

To 22.5 g. of 1,3,8-triaza-7,7,9,9-tetramethyl-spiro[4.5]decane-2,4-dione was added 256 g. of 90 % formic acid and then 162 g. of 37 % aqueous formaldehyde was added dropwise thereto over 1 hour at 20°–30°C. After completion of the dropwise-addition, the resulting mixture was refluxed by gradual heating with stirring for about 7 hours until evolution of gaseous carbon dioxide ceased.

After completion of the reaction, the reaction mixture was cooled, diluted with 800 ml. of water and neutralized to pH 9–9.5 with 45 % aqueous sodium hydroxide. The crystalline mass thus separated was recovered by filtration, washed with water, dried and recrystallized from isopropanol to give the desired product as white crystals melting at 200°–203°C.

Analysis for $C_{12}H_{21}N_3O_2$—Calculated: C,59.23%; H,8.70%; N,17.29%. Found: C,59.43%; H,8.76%; N,17.26%.

EXAMPLE 7

1,3,8-Triaza-7,7,8,9,9-pentamethyl-spiro[4.5]decane-2,4-dithione

To 2.6 g. of 1,3,8-triaza-7,7,9,9-tetramethyl-spiro[4.5]decane-2,4-dithione was added 4 ml. of 30% aqueous formaldehyde, 0.6 ml. of 90% formic acid was added thereto at 50°–60°C. and further 0.5 ml. of 90% formic acid was added at 70°–80°C. The resulting mixture was stirred at the latter temperature for 4 hours.

After cooling, an 30% aqueous solution of potassium hydroxide was added to the reaction mixture and the crystalline mass thus separated was recovered by filtration, washed with water, dried and then recrystallized from benzene to give the desired product as white crystals melting at 135°–136°C.

Analysis for $C_{12}H_{21}N_3S_2$—Calculated: C,53.12%; H,7.80%; N,15.49%; S,23.59%. Found: C,53.05%; H,7.77%; N,15.48%; S,23.71%.

IR spectrum (Nujol mull): $\nu_{NH}$ 3300; 3100 cm$^{-1}$.

EXAMPLE 8

Mixtures were made from 100 parts of polypropylene ("Noblen JHH-G," available from Mitsui Toatsu Chemicals Inc., Japan, employed after two recrystallizations from monochlorobenzene) and 0.25 part of each in turn of the stabilizing compounds of the invention indicated in Table I. The resulting mixtures were blended and melted, and the molten mixtures were moulded under heating and pressure into sheets 0.5 mm. thick. A control sheet, containing no stabilizer, was also made.

The sheets were exposed to ultraviolet irradiation at 45°C. in the "Standard Fade-Meter Type FA-1" manufactured and sold by Toyo Rika Instruments, Inc., Japan (a modification of the Atlas "Fade-O-meter" Type FDA-R which meets the requirements prescribed in paragraph 3.8 of Japanese Industrial Standard L-1044). The time taken for each sheet to become brittle is shown in Table I.

EXAMPLE 9

Mixtures were made from 100 parts of high-density polyethylene ("Hi-Zex," available from Mitsui Toatsu Chemicals, Inc., Japan, employed after two recrystallizations from toluene) and 0.25 part of each in turn of the stabilizing compounds of the invention indicated in Table I. The resulting mixtures were made into sheets, in the same way as in Example 8; and a control sheet was also made, containing no stabilizer.

The brittleness time of each sheet was measured by the same test method as in Example 8.

The results are given in Table I.

Table I.

| Stabilizing Compound No. | Brittleness time (hours) | |
|---|---|---|
| | Polypropylene | High density polyethylene |
| 1 | 560 | 1040 |
| 2 | 260 | 640 |
| 3 | 580 | 1140 |
| 4 | 520 | 960 |
| 5 | 600 | 1180 |
| 6 | 540 | 980 |
| 7 | 440 | 720 |
| 8 | 520 | 880 |
| 9 | 530 | 740 |
| 10 | 500 | 760 |
| 11 | 540 | 800 |

Table I.-Continued

| Stabilizing Compound No. | Brittleness time (hours) | |
| --- | --- | --- |
| | Polypropylene | High density polyethylene |
| 12 | 540 | 860 |
| 13 | 420 | 720 |
| 14 | 580 | 940 |
| None | 60 | 400 |

EXAMPLE 10

Mixtures were made from 100 parts of polystyrene ["Styron," trade name, employed after recrystallization from a mixture of benzene with methanol, available from Asahi-Dow Limited, Japan] and 0.25 part of each in turn of the stabilizing compounds of this invention as indicated in Table II. The resulting mixtures were molded at 180°C. under pressure into a plate with a thickness of 1 mm. A control sheet, containing no stabilizer, was also made.

The plate thus formed was subjected to the exposure of ultraviolet ray irradiation in the Fade Meter as specified in the above Example 8 at 45°C. for 500 hours. A test piece of the treated plate was tested for color difference by means of a color-difference colorimeter according to the method prescribed in Japanese Industrial Standard "K-7103," and a change of the yellowness index of the plate was calculated according to the following equation:

$$\Delta YI = YI - YI_0$$

wherein $\Delta YI$ means a change of yellowness index, YI means a yellowness index after exposure and $YI_0$ means an initial yellowness index of a test piece.

The results are summarized in the following Table II.

Table II.

| Stabilizing compound No. | $YI_0$ | $\Delta YI$ |
| --- | --- | --- |
| 1 | 4.3 | +4.6 |
| 2 | 5.0 | +5.4 |
| 3 | 4.4 | +3.9 |
| 4 | 4.3 | +4.5 |
| 5 | 4.4 | +4.8 |
| 6 | 4.2 | +4.3 |
| 7 | 4.7 | +5.2 |
| 8 | 4.5 | +3.8 |
| 9 | 4.3 | +4.2 |
| 10 | 4.4 | +4.3 |
| None | 4.8 | +16.8 |

EXAMPLE 11

Mixtures were made from 100 parts of ABS resin ["Kane Ace B-12," trade name, available from Kanegafuchi Spinning Co., Ltd.] and 0.5 part of each in turn of the stabilizing compounds of this invention as indicated in Table III, the resulting mixture was kneaded on a kneading roll at 160°C. for 6 minutes and then molded into a sheet with a thickness of about 0.5 mm. A control sheet, containing no stabilizer, was also made.

The sheet thus formed was aged under the following aging condition and retentions of elongation and of tensile strength as well as coloration degree were determined by a conventional method.

Aging test

1. Exposure for 50 hours to the Sunshine Weather Meter prescribed in Japanese Industrial Standard JIS Z-0230 entitled "Accelerated Weathering Test of Rust Proofing Oils," Paragraph 2.
2. Aging at 190°C. for 30 minutes in a Geer's aging tester prescribed in Japanese Industrial Standard JIS K-6301 entitled "Physical Testing Methods for Vulcanized Rubber," Paragraph 6.5.

The results are given in the following Table III.

Table III.

| Stabilizing compound No. | Weather Meter | | Geer's aging tester |
| --- | --- | --- | --- |
| | Retention of elongation (%) | Retention of tensile strength (%) | Discoloration |
| 1 | 66 | 75 | Muddy yellow |
| 3 | 71 | 79 | Pale yellow |
| 5 | 69 | 77 | Pale yellow |
| 8 | 73 | 80 | Pale yellow |
| None | 53 | 69 | Brown |

EXAMPLE 12

Mixtures were made from 100 parts of nylon-6 ("CM 1011," available from Toray Industries Inc., Japan) and 0.25 part of each in turn of the stabilizing compounds of the invention indicated in Table IV. The resulting mixtures were melted and moulded under pressure into films 0.1 mm. thick, by means of a conventional compression-moulding machine. A control film, containing no stabilizer, was also made.

The films thus formed were aged under the aging condition as shown below and subjected to a tensile test to determine their retentions of elongation and of tensile strength by a conventional method.

Aging conditions

1. Exposure for 200 hours to ultraviolet irradiation at 45°C. in the Fade-Meter.
2. Aging at 160°C. for 2 hours in the Geer's aging tester.

The results are shown in Table IV.

Table IV.

| Stabilizing compound No. | Fade-Meter | | Geer's aging tester | |
| --- | --- | --- | --- | --- |
| | Retention of elongation(%) | Retention of tensile strength(%) | Retention of elongation(%) | Retention of tensile strength(%) |
| 1 | 68 | 81 | 75 | 72 |
| 3 | 72 | 77 | 72 | 69 |
| 5 | 66 | 71 | 67 | 68 |
| 8 | 63 | 73 | 74 | 73 |
| None | 16 | 49 | 23 | 51 |

EXAMPLE 13

Mixtures were made from 100 parts of polyurethane prepared from polycaprolactone ("E-5080," available from The Nippon Elastollan Industries Ltd., Japan) and 0.5 part of each in turn of the stabilizing compounds of the invention indicated in Table V. The resulting mixture were melted and moulded into sheets about 0.5 mm. thick. A control sheet, containing no stabilizer, was also made.

The sheets thus formed were exposed to ultraviolet irradiation for 15 hours at 45°C. in the Fade Meter described in Example 8 and their retention of elongation and tensile strength were then measured. The results are given in Table V.

Table V.

| Stabilizing compound No. | Retention of elongation (%) | Retention of tensile strength (%) |
| --- | --- | --- |
| 1 | 86 | 77 |
| 3 | 91 | 73 |
| 5 | 82 | 84 |
| None | 72 | 54 |

EXAMPLE 14

Mixtures were made from 100 parts of polyvinyl chloride ("Geon 103 EP," available from The Japanese Geon Co., Ltd., Japan), 40 parts of dioctyl phthalate and 0.2 part of each in turn of the stabilizing compounds of the invention indicated in Table VI. The resulting mixture were kneaded for 5 minutes on kneading rolls at 140°C., and formed into sheets about 1 mm. thick. A control sheet, containing none of the stabilizers of the invention, was also made.

The sheets thus formed were aged under the conditions described below, and the degree of discoloration was noted.

Aging conditions

1. Exposure for 200 hours in the Sunshine Weather Meter shown above.
2. Aging at 160°C. for 30 minutes in the Geer's aging tester.

The results are shown in Table VI.

Table VI.

| Stabilizing compound No. | Weather Meter | Geer's aging tester |
| --- | --- | --- |
| 1 | Yellowish brown | Pale brown |
| 3 | Pale brown | Pale brown |
| 5 | Light brown-brown | Pale brown |
| None | Dark brown | Reddish brown |

EXAMPLE 15

Mixtures were made from 100 parts of polyester resin ["Ester-G13," trade name, available from Mitsui Toatsu Chemicals, Inc., Japan], 1 part of benzoyl peroxide and 0.2 part of each in turn of the stabilizing compounds as indicated in Table VII. The resulting mixture was cured by pre-heating at 60°C. for 30 minutes and then heating at 100°C. for additional 1 hour to formed into a plate with a thickness of 3 mm. A control plate, containing no stabilizer, was also made.

The plate thus formed was exposed to irradiation in the Sunshine Weather Meter as described in the above Example 11 for 60 hours and the change of yellowness index thereof was determined according to the method described in the above Example 10.

The results are given in the following Table VII.

Table VII.

| Stabilizing compound No. | $YI_0$ | $\Delta YI$ |
| --- | --- | --- |
| 1 | 2.4 | +7.3 |
| 3 | 2.2 | +8.9 |
| 5 | 2.3 | +9.0 |
| None | 1.8 | 13.9 |

EXAMPLE 16

Mixtures were made from 100 parts of polyacetal resin ["Delrin 500," trade name, available from Showa Neoprene K.K., Japan] and 0.5 part of each in turn of the stabilizing compounds of this invention as indicated in Table VIII. The resulting mixture was heated and melted at 220°C.

The resulting mixture was aged with heating at 222°C. in atmosphere for 30 minutes and then rate of reduction in decomposition was measured.

The results are given in the following Table VIII.

Table VIII.

| Stabilizing compound No. | Rate of reduction reduction in decomposition (%) |
| --- | --- |
| 1 | 0.53 |
| 3 | 0.58 |
| 5 | 0.47 |
| None | 0.80 |

It will be apparent from the above Tables 1 to VIII that the piperidine-spiro-hydantoin derivatives (I) of this invention have an excellent stabilizing effect on various synthetic polymers.

What is claimed is:

1. A synthetic polymer composition stabilized against photo- and thermal-deterioration wherein there is incorporated, in a sufficient amount to prevent said deterioration, at least one compound having the formula

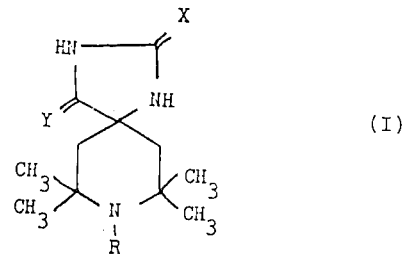

(I)

wherein
R is an alkyl group of 1 to 8 carbon atoms, an alkenyl group of 3 to 4 carbon atoms, an alkenoyl group of 3 to 4 carbon atoms, an alkoxyalkyl group of 1 to 8 carbon atoms in each of the alkoxy and alkyl moieties, an alkoxycarbonylalkyl group of 1 to 4 carbon atoms in the alkyl moiety and of 1 to 18 carbon atoms in the alkoxy moiety, an acyloxyalkyl group of 1 to 4 carbon atoms in the alkyl moiety and of an unsaturated or saturated aliphatic or aromatic acyl moiety and a cyanoalkyl group of 1 to 4 carbon atoms and X and Y each represent oxygen atom.

2. The synthetic polymer composition according to claim 1 wherein said compound (I) is incorporated in an amount of 0.01–5.0% by weight, based upon the amount of the synthetic polymer.

3. The synthetic polymer composition according to claim 1 wherein said polymer is a polyolefin.

4. The synthetic polymer composition according to claim 1 wherein said polymer is a polyvinyl chloride.

5. The synthetic polymer composition according to claim 1 wherein said polymer is a polyurethane.

6. The synthetic polymer composition according to claim 1 wherein said polymer is a polyester.

7. The synthetic polymer composition according to claim 1 wherein said polymer is a polyacetal.

8. The synthetic polymer composition according to claim 1 wherein said polymer is an acrylonitrile-styrene-butadiene copolymer.

9. The synthetic polymer composition according to claim 1 wherein said compound (I) is selected from the group consisting of
1,3,8-triaza-7,7,8,9,9-pentamethyl-spiro[4.5]decane-2,4-dione,
1,3,8-triaza-7,7,9,9-tetramethyl-8-octyl-spiro[4.5]-decane-2,4-dione,
1,3,8-triaza-8-(2-ethoxyethyl)-7,7,9,9-tetramethyl-spiro-[4.5]decane-2,4-dione,
8-acryloyl-1,3,8-triaza-7,7,9,9-tetramethyl-spiro[4.5]decane-2,4-dione,
8-allyl-1,3,8-triaza-7,7,9,9-tetramethyl-spiro[4.5]-decane-2,4-dione,
8(2-acetoxyethyl)-1,3,8-triaza-7,7,9,9-tetramethyl-spiro-[4.5]decane-2,4-dione,
1,3,8-triaza-8-(2-cyanoethyl)-7,7,9,9-tetramethyl-spiro[4.5]-decane-2,4-dione and
1,3,8-triaza-8-ethoxycarbonylmethyl-7,7,9,9-tetramethyl-spiro[4.5]decane-2,4-dione.

* * * * *